Figure 1:
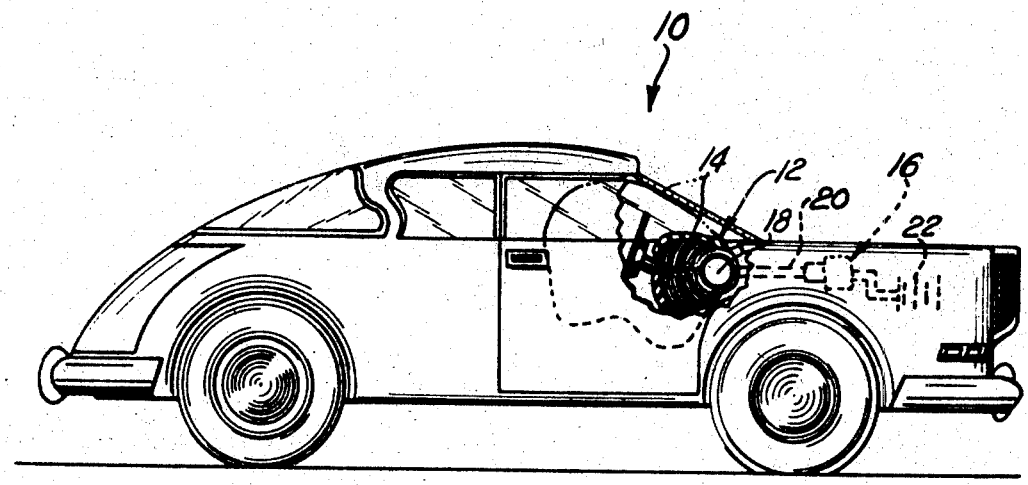

United States Patent [19]
Hass

[11] 3,720,915
[45] March 13, 1973

[54] VEHICLE CRASH SENSOR CONDITION TESTER
[75] Inventor: David P. Hass, Detroit, Mich.
[73] Assignee: Eaton Corporation, Cleveland, Ohio
[22] Filed: Dec. 6, 1971
[21] Appl. No.: 205,078

[52] U.S. Cl. .............................. 340/52 H, 340/262
[51] Int. Cl. ............................................. G08b 21/00
[58] Field of Search ............... 340/52, 52 H, 71, 262

[56] References Cited

UNITED STATES PATENTS 3,489,917  1/1970  Gurol ........................... 340/262 X
3,622,974  11/1971 Best .............................. 340/52 H X Primary Examiner—Alvin H. Waring
Attorney—Teagno & Toddy

[57] ABSTRACT

A crash sensor condition tester for use with a sensor assembly employed for actuating a vehicle safety apparatus upon the occurrence of a collision. The sensor assembly includes an inertia member positioned for movement in response to vehicle deceleration of a predetermined magnitude to actuate an electrical switch means. The switch means, in turn, serves to complete an electrical circuit to energize a detonator. This actuates the safety system which employs a confinement which, upon energization of the detonator, is inflated to an expanded condition. The sensor testing device includes a mechanism to move the inertia member to actuate the switch means. The detonator means is electrically deactivated and an indicator means provides an indication when the switch means is actuated.

11 Claims, 2 Drawing Figures

PATENTED MAR 13 1973 3,720,915

VEHICLE CRASH SENSOR CONDITION TESTER

This invention relates to a vehicle safety system of the passive type in which a vehicle safety device is actuated by a crash sensor, and, more particularly, relates to a condition tester for testing the operability of the crash sensor.

A vehicle safety system, of a type to which the present invention may be applied, is shown, for example, in the U.S. Pat. to S. Oldberg et al. No. 3,414,292, assigned to the same assignee as the present invention. That safety system employs an inflatable confinement which is inflated to restrain movement of a vehicle occupant during a collision. The confinement is inflated when a crash sensor detects a vehicle deceleration of a predetermined magnitude. To accomplish this, the sensor employs a movable inertia member arranged to move against a spring force during vehicle deceleration of a predetermined magnitude to close an electric switch. This completes an electrical circuit to energize a detonator which, in turn, serves to cause the confinement to be inflated to its expanded condition.

The sensor for a passive safety apparatus must be functional for the safety apparatus to be activated thereby, and it is important that the operator know that the sensor is functional. Accordingly, it is desirable that the sensor be periodically checked for reliability. Preferably, but not necessarily, such a check should be made each time a motor vehicle employing such a safety system is operated. In addition, it is desirable that the detonator be isolated during such a test to prevent the confinement from being accidentally inflated. It is also desirable that an indicator, such as a light, be energized if the sensor is in an operable condition during the test. Such periodic testing of the sensor assembly also has the feature of periodically closing the switch for the detonator. Consequently, the contact points of the switch are periodically wiped to maintain electrical continuity and keep the contacts clean, depending upon the structure thereof.

The present invention contemplates the provision of a passive vehicle safety system activated by a crash sensor. The crash sensor includes a movable inertia member, positioned for movement relative to the vehicle in response to vehicle deceleration of a predetermined magnitude to actuate an electrical switch means for purposes of completing an electrical circuit to energize an electrically actuatable means which causes the safety device to be actuated.

In accordance with the present invention, the sensor is periodically tested for operability, and specifically means is provided for moving the inertia member sufficiently to actuate the switch means as an operability test. The electrically actuated means is electrically disconnected from the switch during the test and indicator means is connected to the circuit to provide an indication when the switch is actuated during the test. In this manner, an indication may be obtained as to the operability of the crash sensor. The indicator means preferably is a light on the dashboard of the vehicle which, when energized, indicates that the sensor is operable.

Accordingly, it is a principal object of the present invention to provide a vehicle safety system which is actuated by a crash sensor having a movable inertia member and wherein the system is constructed so that a periodic test of the operability of the sensor is effected.

A further object of the present invention is the provision of a new and improved vehicle safety system which is actuated by a crash sensor having a movable inertia member which moves relative to switch contacts upon a predetermined degree of vehicle deceleration and wherein the movable mass, for purposes of testing the operability of the sensor system, is moved by an electrical coil to its actuated condition and an indicator is actuated thereby and indicates that the mass has moved under test conditions to its actuated position.

A still further object of the present invention is the provision of a new and improved vehicle safety system, as noted in the next preceding paragraph, wherein the system includes an electrically actuated means for activating the safety device and wherein during the test of the operability of the sensor, the electrically actuated means is disconnected from the circuit.

Figure 2:
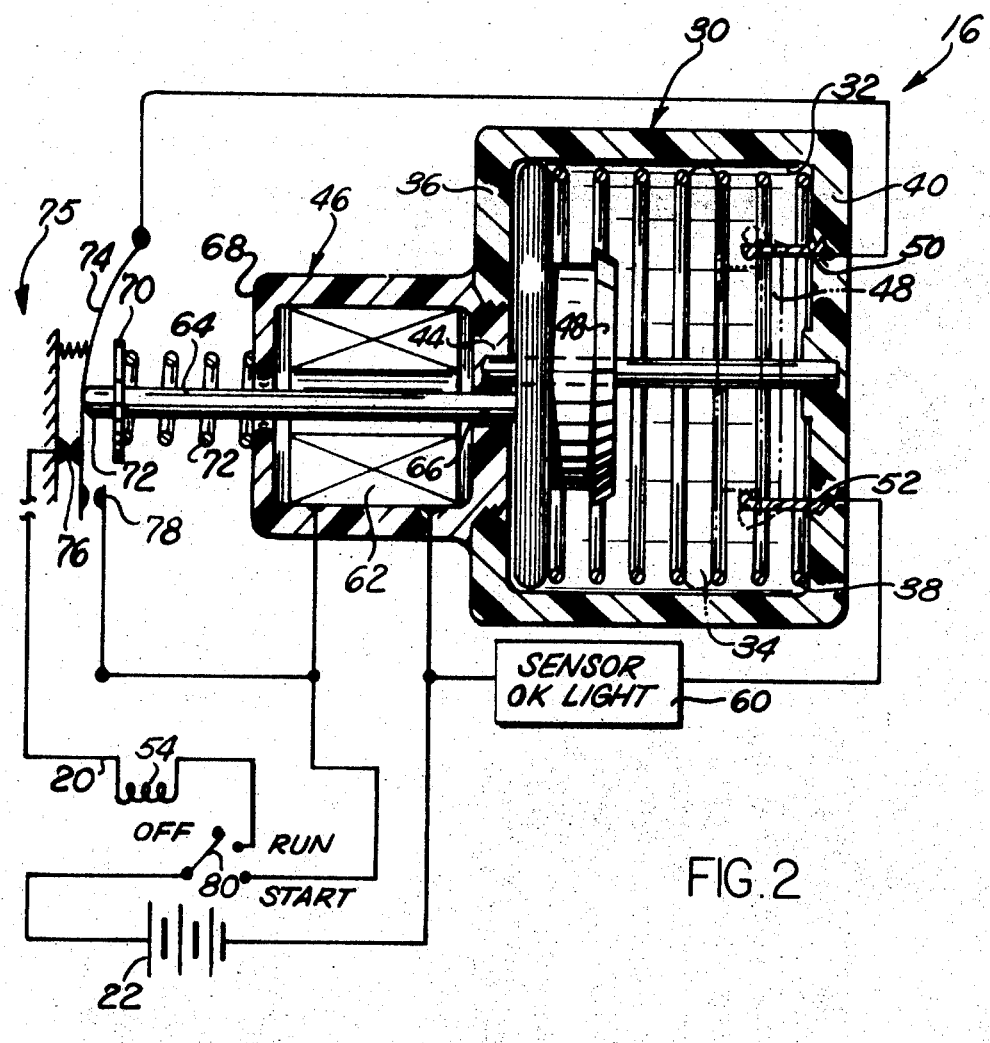

The foregoing and other objects and advantages of the present invention will become more readily apparent from the following description of the preferred embodiment of the invention taken in conjunction with the accompanying drawings which are a part hereof and wherein:

FIG. 1 is a schematic illustration showing a vehicle safety system to which the present invention may be applied; and FIG. 2 is a sectional view illustrating a sensor assembly for use in the system shown in FIG. 1, together with the sensor condition testing apparatus, in accordance with the present invention.

The present invention provides an improved vehicle safety system which is actuated by a sensor having a mass which moves to actuate a safety device. In accordance with the present invention, the mass is periodically moved for testing the operability of the sensor. The improved sensor system with the test feature can be used with a variety of safety devices and an inflatable occupant restraint is an example of one such safety device.

Referring now to the drawings wherein the showings are for purposes of illustrating the preferred embodiment of the invention only, and not for purposes of limiting same, FIG. 1 schematically illustrates an automotive vehicle 10 which employs a vehicle safety system 12. The safety system 12 includes a confinement 14 which is inflated, from a collapsed condition shown in solid lines in FIG. 1, to an expanded condition, shown in dash lines in FIG. 1, for purposes of restraining movement of an occupant in the vehicle during a collision. A collision sensor assembly 16 is electrically connected to system 12 and is operative to detect the occurrence of a collision and effect activation of the safety system so that the confinement 14 is inflated to the condition shown by the dotted lines in FIG. 1 upon the occurrence of an accident.

The sensor assembly 16 is preferably mounted on the fire wall of the vehicle; however, it is contemplated that the sensor assembly can be mounted on another part of the vehicle, if desired.

The safety system 12 may take various forms and, for example, may be constructed in the manner disclosed in the aforesaid U.S. Pat. No. 3,414,292. Generally, the safety system employs a fluid supply in the form of a reservoir 18 containing fluid under pressure. A detonator is associated with the reservoir for forming an opening therein to enable fluid to escape therefrom upon the occurrence of a collision. The detonator includes a detonator coil which is electrically activated by the sensor assembly 16 through an interconnecting electrical circuit 20. Operation of the sensor assembly completes a circuit through circuit 20 to conduct current from a source of power, such as the vehicle's battery 22, to the detonator coil to effect activation of an explosive charge to cause the confinement 14 to be inflated.

Referring now to FIG. 2, the sensor assembly 16 is illustrated in greater detail, and includes a housing 30 which is suitably supported on the fire wall of the vehicle. Housing 30 has a wall which defines a cylindrical chamber 32 in which an inertia member 34 is located. Inertia member 34 is biased against one end 36 of the housing 30 by means of a coil spring 38. Spring 38 is a low rate spring having an outside diameter closely approximating the internal diameter of chamber 32 to prevent buckling of the spring. One end of spring 38 seats against one end 40 of housing 30 and the opposite end of spring 38 seats against inertia member 34. The inertia member is a disc-shaped annular mass having an axial bore so that it may be slidably carried on a shaft 42 which extends through the bore and has one end secured to housing wall 40 and the opposite end secured to one end 44 of a housing 46. Inertia member 34 is mechanically secured to an electrical contact 48 which is disc-shaped and provided with an axial bore so that it may slide on shaft 42 along with inertia member 34. Contact 48 is located between inertia member 34 and housing end 40 so that it faces a pair of spaced apart resilient switch contacts 50, 52, each having one end secured to the interior side of housing end 40, and having its opposite end facing the movable contact 48. The free ends of stationary contacts 50, 52 are arranged so that the movable contact 48 moves into engagement with the contacts 50, 52 and cams them apart during operation. This results in a wiping action of the mass on the contacts 50, 52. The actuated position of these parts is shown in dotted lines in FIG. 2.

Upon the occurrence of a collision, housing 30 decelerates as a result of the collision, since it is fixedly mounted to the vehicle's fire wall. However, the inertia member 34 tends to continue to move due to its inertia or momentum in a forward direction relative to the vehicle. The inertia member 34 moves against the bias of spring 38 away from housing end 36 so that movable switch member 48 makes electrical engagement with stationary contacts 50 and 52. This completes an electrical circuit through the stationary contacts, the vehicle battery 22 and circuit 20 so as to electrically energize detonator coil 54. Energization of the detonator coil causes detonation of an explosive charge in the safety apparatus 12 causing inflation of the confinement 14 in a known manner.

In accordance with the present invention, apparatus is provided for use in testing the operability of sensor assembly 16. Preferably, sensor assembly 16 is tested each time the vehicle 10 is operated and a visual indication is presented to the operator, if the sensor assembly is in operative condition. This may be accomplished in various ways, and, preferably, in accordance with the present embodiment of the invention, means is provided for displacing the inertia member 34 so that contact 48 engages stationary contacts 50, 52, each time the vehicle is operated. A sensor light 60, which may be mounted on the dashboard of vehicle 10, is electrically connected to contacts 50, 52 so that the light is energized when movable contact 48 engages stationary contacts 50, 52.

Movement may be imparted to inertia member 34 in various fashions and, in accordance with the present invention, this is accomplished with the use of a solenoid provided in the housing 46. Housing 46 is suitably secured to housing 30, as by threading housing end 44 into a corresponding threaded aperture in housing wall end 36. Housing 46 contains a solenoid coil 62, together with a solenoid rod 64 having one end extending through an aperture 66 in housing end 44 so that the rod may engage inertia member 34. When coil 62 is energized, rod 64 moves against inertia member 34 and displaces the inertia member against the force of spring 38 so that movable contact 48 engages stationary contacts 50, 52. The opposite end of rod 64 slidably extends through housing end 68 and carries a retainer ring 70. A coil spring 72 coaxially surrounds rod 64 between the retainer ring 70 and the exterior side of housing end 68 so that the rod 64 is normally biased to the left, as viewed in FIG. 2. The left rod end 73 normally bears against a movable spring contact arm 74 of a detonator cut-out switch 75 so that the arm 74 electrically contacts a stationary contact 76. When the solenoid coil 62 is energized, rod 64 moves to the right, as viewed in FIG. 2, against the bias of spring 72 to cause movable contact 48 to engage stationary contacts 50, 52. In addition, this movement of rod 64 breaks the electrical connection between contact spring arm 74 and stationary contact 76, since arm 74 is resiliently biased toward the right, as viewed in FIG. 2. As rod 64 continues its rightward movement, spring contact arm 74 makes electrical contact with a stationary contact 78.

Still further in accordance with the present invention, it is contemplated that the sensor condition testing mechanism operate in conjunction with the ignition switch of the motor vehicle 10. Typically, such a vehicle employs an ignition switch having an OFF position, a RUN position, and a START position. Such an ignition switch is shown in FIG. 2 wherein a movable contact arm 80 may be selectively positioned from the OFF position to the START position and, as is conventional, a spring means (not shown) is provided for automatically returning the contact arm to the RUN position.

In operation, when the switch arm 80 is initially positioned to the RUN position, a circuit is completed with the battery 22 for energizing solenoid coil 62. Consequently, solenoid rod 64 is displaced toward the right so that contact 74 breaks its electrical connection with contact 76. Detonator coil 54 is not electrically isolated from the circuit and cannot be energized by battery 22. As rod 64 moves to the right, spring contact arm 74 electrically engages stationary contact 78, Continued movement of rod 64 to the right causes inertia member 34 to be positioned so that movable contact 48 makes electrical contact with stationary contacts 50, 52. This completes a circuit from battery 22 through the sensor light 60, contacts 48, 50 and 52, spring contact arm 74, stationary contact 78, and switch arm 80. The sensor light 60 is energized to indicate to the vehicle operator that the sensor assembly is in an operative condition. As switch 80 is moved, as by a spring, from the START position to the RUN position, the detonator coil 54 cannot be energized until sufficient time has elapsed for solenoid coil 62 to be deenergized so that spring 72 biases rod 64 to displace spring contact 74 to electrically engage contact 76. If during vehicle operation a collision occurs, inertia member 34 is displaced to the right against the bias of spring 38 so that movable contact 48 engages contacts 50, 52 and a circuit will be completed to energize the detonator coil 54 to cause the confinement 14 to be expanded in a known manner.

In this embodiment of the invention, it is apparent that each time the vehicle is operated a check is conducted to determine whether or not the sensor assembly is operative. In addition, the periodic electrical engagement between movable contact 48 and stationary contacts 50, 52 provides a wiping action to maintain the electrical contacting surfaces clean and thereby enhance the reliability of operation. This results due to the fact that the contacts 50, 52 are resilient and urged apart as the sensor portion 48 moves into contact therewith. In addition, unless the battery is properly charged, there will not be sufficient current flow during the test operation to energize sensor light 60, whereupon corrective action may be taken by the vehicle operator. It is also to be appreciated that each test operation is conducted in a manner such that the detonator coil 54 is electrically isolated.

Housings 30 and 46 are illustrated as being constructed of a plastic material. These housings may be of metal, providing the necessary electrical insulation be provided to prevent an accidental short circuit between contacts 50 and 52, or between the movable contacts 48 and the housing walls. In addition, whereas housings 30 and 46 are illustrated as being separate housings which are threaded together, they may be molded as a single unit.

Having described my invention, I claim:

1. In a vehicle safety system including a safety device having a deactivated condition and an activated condition to which the safety device is operated by an electrically actuated device, a crash sensor including a movable inertia member positioned for movement relative to said vehicle in response to vehicle deceleration of a predetermined magnitude, and electrical switch means responsive to a predetermined movement of said inertia member for completing an electrical circuit to energize the electrically actuated device, testing means for testing for the operability of the said crash sensor including means for moving said inertia member sufficient to actuate said switch means, and means for electrically deactivating said electrically actuated device when said inertia member is moved by said testing means.

2. A system as set forth in claim 1 wherein said testing means further includes indicator means for providing an indication that said switch means is actuated, and said indicator means including a visual display means for providing a visual display indicative that said switch means is actuated.

3. A system as set forth in claim 1 wherein said indicator means is electrically energizable, and electric circuit means for electrically energizing said indicator means when said switch means is actuated.

4. A system as set forth in claim 1 wherein said deactivating means includes means responsive to said moving means for deactivating said detonator means.

5. A system as set forth in claim 4 wherein said deactivating means includes cut-out switch means responsive to said moving means for electrically deactivating said electrically actuated device.

6. A system as set forth in claim 5, wherein said moving means is electrically energizable for, when electrically energized, moving said inertia member sufficient to actuate said switch means.

7. A system as set forth in claim 6 wherein said moving means includes a solenoid having a coil and a rod positioned so that upon energization of said coil, said rod moves in a given direction to displace said inertia member sufficient to actuate said switch means.

8. A system as set forth in claim 7 including cut-out switch means having a first condition during which said electrically actuated device may be energized and a second condition during which said electrically actuated device is electrically disconnected from said switch means, and resilient means for resiliently biasing said solenoid rod to engage said cut-off switch means and maintain same in its first condition until said solenoid coil is energized.

9. A system as set forth in claim 1 for use with a vehicle employing an ignition switch having an OFF position, a START position for starting the vehicle and a RUN position for normal vehicle operation, said improvement further comprising said inertia member moving means being electrically energizable, and START circuit means adapted to be completed through said ignition switch when in said START position for energizing said inertia member moving means sufficient to actuate said switch means.

10. A system as set forth in claim 9 wherein said indicator means and said switch means are connected in series for circuit completion through said ignition switch when it is in said START position.

11. In a vehicle safety system adapted for use with a motor vehicle having a battery and a three-position ignition circuit including an OFF position, a START position for starting the vehicle and a RUN position for normal vehicle operation and wherein said safety system employs an inflatable confinement having a collapsed condition and an expanded condition for restraining movement of a vehicle occupant during a collision, a crash sensor including a movable inertia member positioned for movement relative to said vehicle in response to vehicle deceleration of a predetermined magnitude to actuate an electrical switch means for completing an electrical circuit with said battery through said ignition switch when in its RUN position to energize detonator means for causing said confinement to be inflated to its expanded condition, the improvement comprising electrically energizable means for moving said inertia member sufficient to actuate said switch means, circuit means connected to said electrically energizable means for completing a circuit with said battery and said ignition switch when in its START position for energizing said inertia member moving means, and indicator means for providing an indication representative that said switch means is actuated.

* * * * *